July 25, 1967     T. S. JOUHAL ETAL     3,332,342
COMPACTING MEANS FOR SCRAP METAL SHEARS
Filed Aug. 26, 1965     4 Sheets-Sheet 2
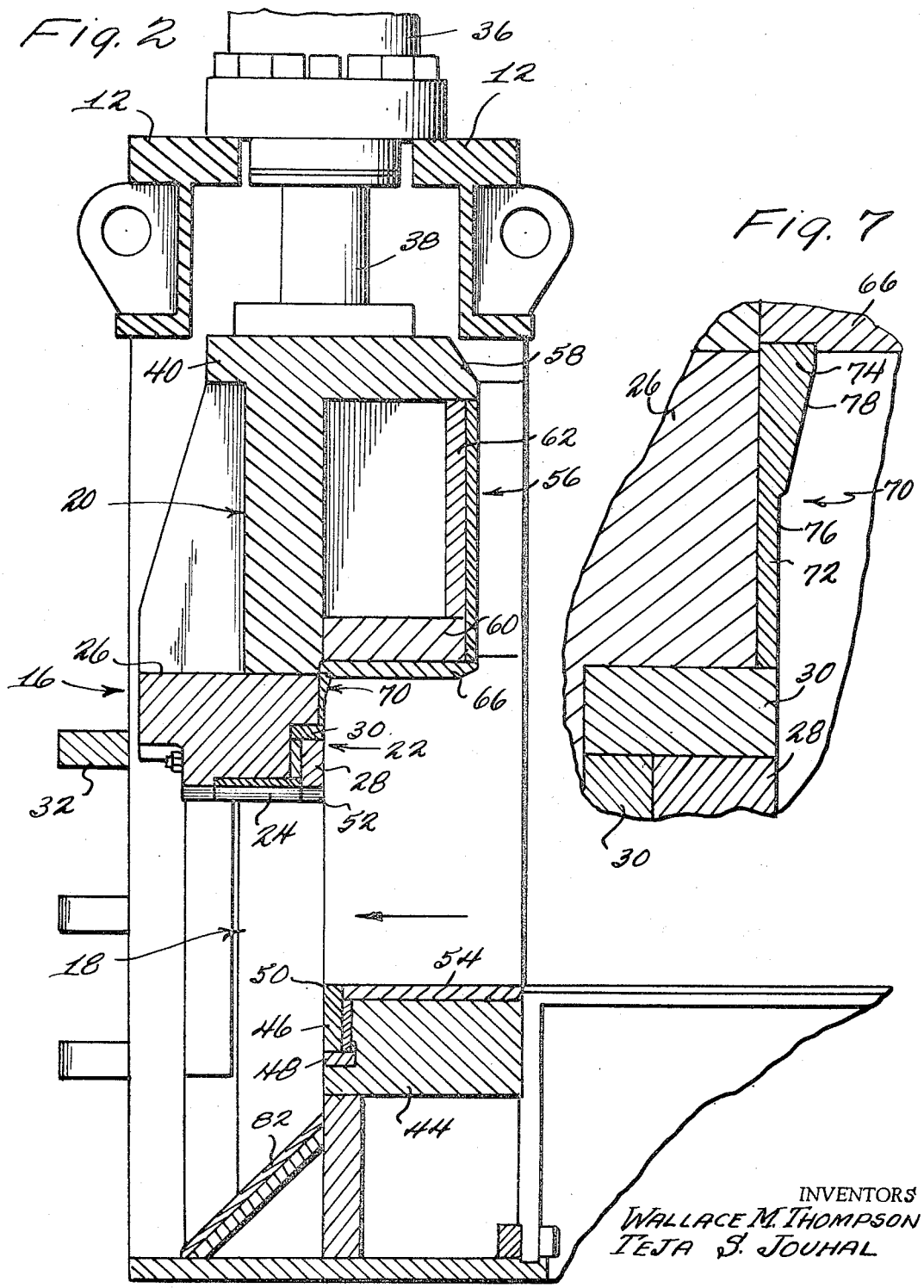
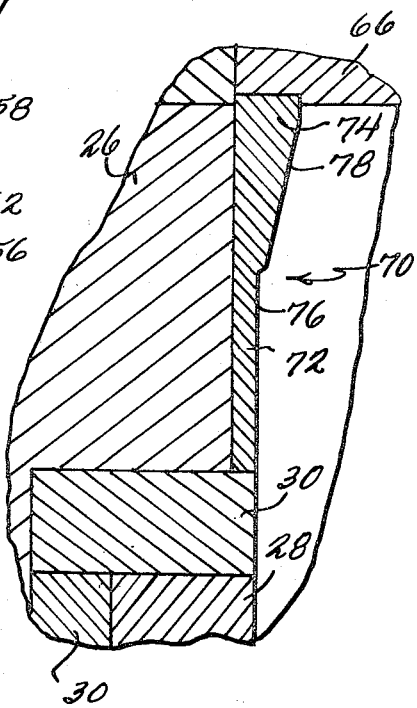
INVENTORS
WALLACE M. THOMPSON
TEJA S. JOUHAL
BY Cushman, Darby & Cushman
ATTORNEYS INVENTORS
WALLACE M. THOMPSON
TEJA S. JOUHAL
BY
Cushman, Darby & Cushman
ATTORNEYS

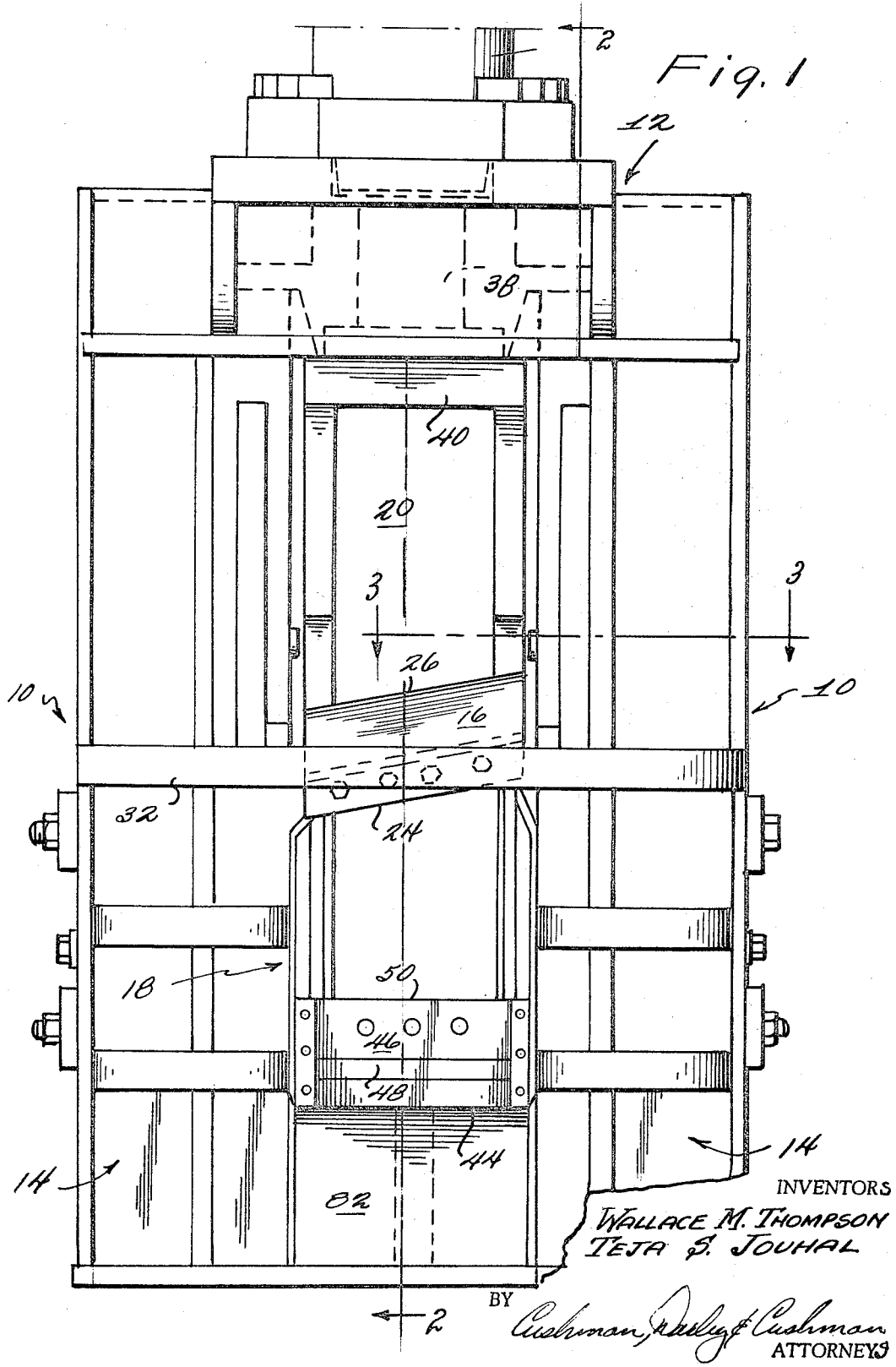

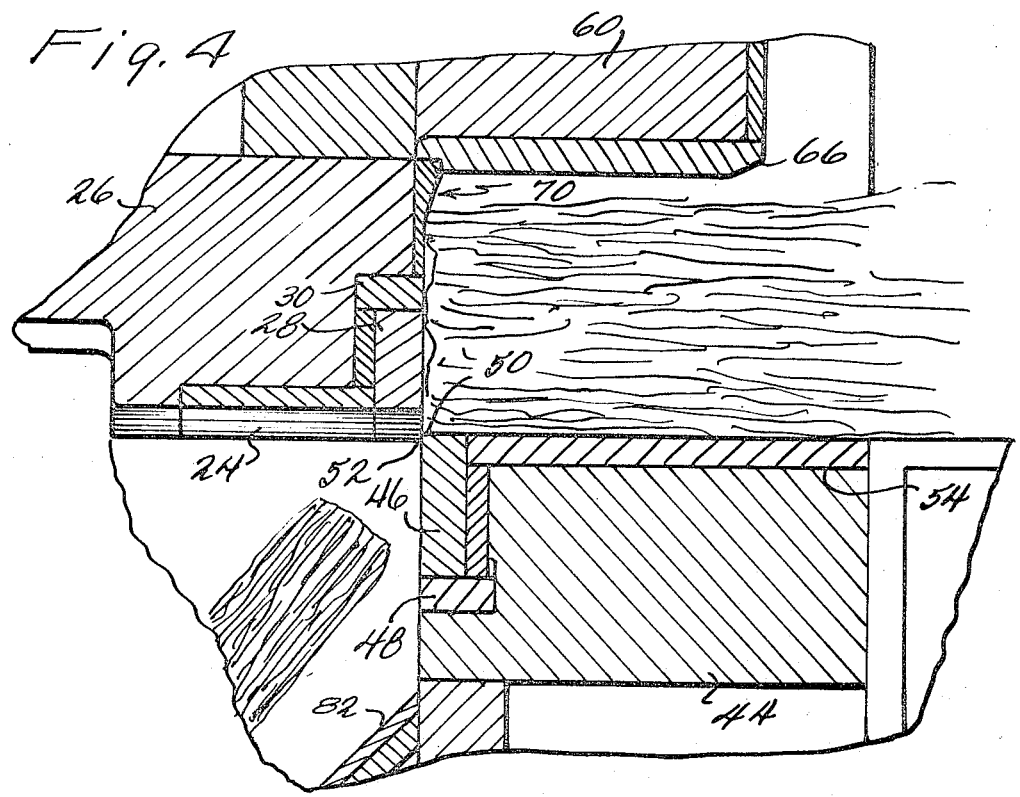
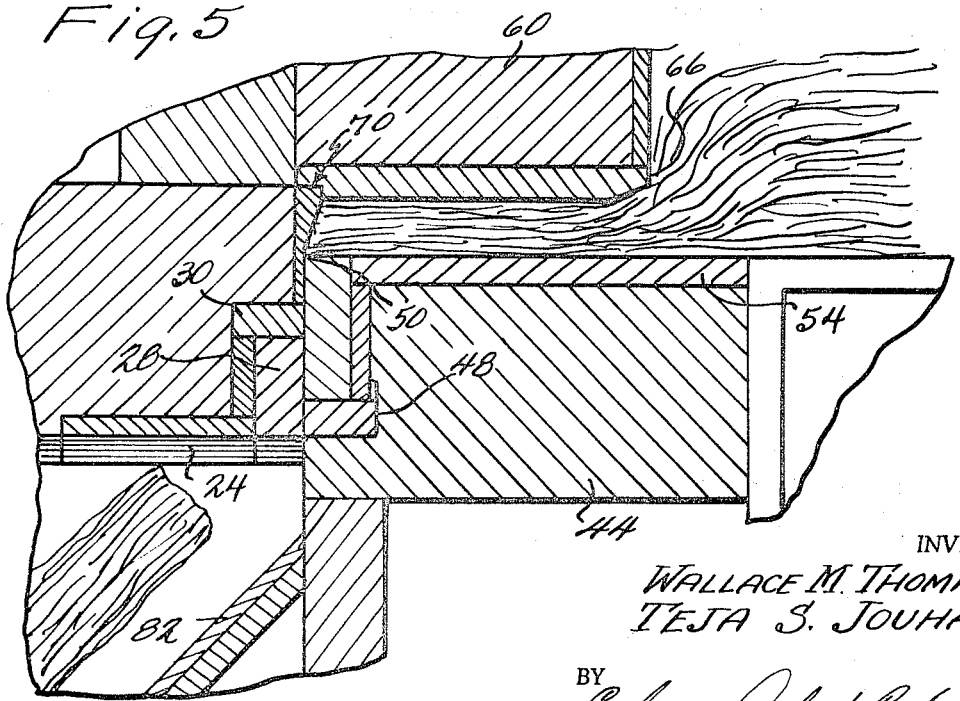

United States Patent Office 3,332,342
Patented July 25, 1967

3,332,342
COMPACTING MEANS FOR SCRAP METAL SHEARS
Teja S. Jouhal and Wallace M. Thompson, Cordele, Ga., assignors to Harris Press and Shear Corp., Cordele, Ga., a corporation of Minnesota
Filed Aug. 26, 1965, Ser. No. 482,774
12 Claims. (Cl. 100—98)

This invention relates to scrap metal shearing apparatus of the type having a movable shear and cooperative compacting means, and more particularly relates to improvements in the compacting means for effecting a final flattening or compacting of the scrap metal immediately prior to shearing.

Shearing apparatus of the general type mentioned above is well known, an example thereof being illustrated in Patent No. 3,037,446 issued June 5, 1962, to Wallace M. Thompson. Such shears are commonly used to cut up metal scrap such as automobile bodies, structural elements, and the like, in order to facilitate the subsequent handling and transport of the scrap. Usually, the shearing apparatus is employed in association with a charging box which compacts the scrap in order to increase the density of the scrap and so that the scrap will be reduced in size for entry into the shear. After this compacting in the charge box, the scrap is normally fed directly into the shear by means of a ram associated with the charging box.

However, it is well known that the compacting applied to the scrap in the charge box still leaves the scrap in a state of relatively low density, and for that reason it is highly desirable to apply a second, or final, stage of compacting immediately before the scrap is sheared. In prior shears, this final stage of compacting has usually been effected by means of a hydraulically-driven vertically movable hold-down clamp which is separately movable from the shearing head. In these shears, the time consumed by separate, successive movements of the hold-down clamp and the shear head have added substantially to the costs of processing scrap and other types of work and, in addition, separate guide systems, motors and the like for these have increased the manufacturing cost and complexity of the shear.

The present invention contemplates an improved shearing apparatus wherein the scrap to be fed into the shear is given a second or final, as the case may be, compacting, without any necessity for having two independently movable heads, one for compacting and one for shearing. In the present invention, the compacting is accomplished by a ledge or compression member disposed behind the cutting edges of the movable shear blade (with respect to the direction of travel of the blade toward the work) and extending rearwardly from the shear cross head and carried thereby. As the shear head moves toward the work the blade shears the work, moving on past the fixed shear blade, and then compression member compacts the work which rests rearwardly of the cutting blades. Thus, both the shearing and compacting operations are effected during one stroke of a single hydraulic cylinder, and the time required for a cycle of operation is reduced since a plurality of separate movements by two independently movable means are eliminated.

Accordingly, it is an object of this invention to provide an improved shearing machine having an improved compacting structure which is carried by the shearing head so that shearing and compacting operations are accomplished during a single motion of the shear head.

It is another object of the present invention to provide an improved shearing machine wherein the total motor force is employed, first, to effect the shearing of the scrap and, second, to effect compacting of the scrap on the shear bed rearwardly of the shear head.

It is a further object of the present invention to provide means associated with the shear cross head which tend to displace or wedge the scrap remaining on the bed rearwardly away from the edge of the lower fixed shear blade in order that, upon the upward rise of the movable shear head, the movable shear blade does not catch and lift or expand the scrap situated on the bed.

It is a still further object of this invention to provide a shearing machine having the aforesaid advantages and characteristics, but which is inexpensive to construct and simple and economical to operate.

Still further objects, advantages, and novel features of the present invention will become apparent to those skilled in the art from the following descriptions and the accompanying drawings in which:

FIGURE 1 is a full elevational view of a shear embodying this invention;

FIGURE 2 is a vertical sectional view of the machine shown in FIGURE 1 taken along the line 2—2;

FIGURE 4 is a view corresponding to FIGURE 2, but illustrating the position of the shear parts during the shearing operation;

FIGURE 5 is a view corresponding to FIGURES 2 and 4, but illustrating the position of the shear parts during the compacting operation;

FIGURE 7 is an enlarged fragmentary view showing details of the inclined wedge member and the compression ledge.

Figure 3:
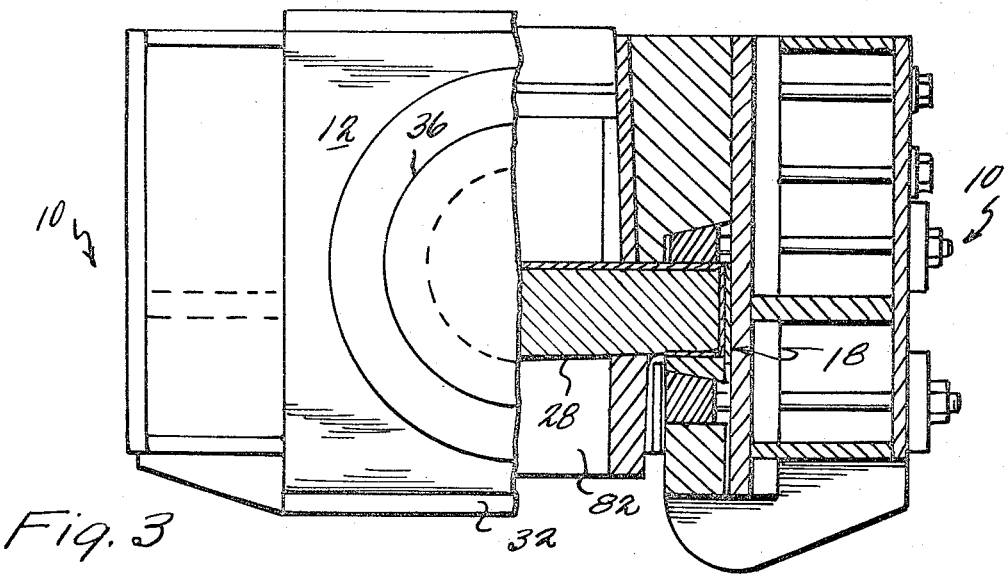
FIGURE 3 is a plan view, partially in section, taken substantially along the line 3—3 of FIGURE 1.

Referring now more particularly to the drawings, and especially FIGURE 1 thereof, there is shown a scrap metal shear having a frame composed of spaced, upright side members 10 interconnected at the top by a cross member 12 and at the bottom by a cross member 14, all of these side and cross members being formed by suitably rigid reinforced assemblies.

A shearing head or movable blade structure 16 is vertically movable within vertical guideways 18 located on the opposed sides of the upright side members 10. This shearing head 16 has a plate-like member 20 having a flat rear face 22 (as viewed in FIGURE 1), and a lower face 24 which is inclined from the horizontal, increasing in elevation from left to right. The lateral edges of the plate member 20 are received within the guideways 18. The shearing head also includes a lower cross member 26 immediately below the member 20 which carries the shearing blade or knife 28 and, accordingly, this cross member is provided with a recess in its rear and lower surfaces to receive the blade 28 (see FIGURE 2). Normally, the blade and the cross member 26 have their lower surfaces inclined to the same degree from the horizontal as the main shearing head, and the blade is spaced within the recess of the cross member by shims or wear plates 30. In addition to the parts mentioned hereinabove, the frame is also provided with a plurality of stiffening and strengthening ribs, webs and flanges, such as cross member 32, which reinforce and rigidify the frame structure and provide means by which the frame may be lifted by a crane or similar mechanism for transporting the same. Since these structural features are well known and form no part of this invention, further detail herein will not be necessary.

On the top of the frame member 12 is a double acting hydraulic motor 36 having its depending piston rod 38 connected to the upper cross member 40 of the shearing head 16, for moving the latter vertically in either an upward or a downward motion within the guide ways 18.

Extending between the side frame members 10 and spaced above the bottom frame member 14 is a transverse bed member 44. This bed member is provided with a recess in its forward and upper surfaces to accommodate a fixed blade member 46. Wear plates 48 are provided which define a seat within the recess for this fixed blade 46. The fixed blade has a forward cutting edge 50 which is adapted to cooperate with the cutting edge 52 of the movable blade 28 in order to shear scrap or similar work, and projecting forwardly beyond the fixed blade. Extending rearwardly from the fixed blade atop the bed member 44, is a bed linear 54 upon which scrap or other work is received to be advanced between the blades of the shear. Normally, the scrap is delivered to the shear bed 44 from a charging box (not shown) which is associated with the shear frame and disposed rearwardly therefrom (as viewed in FIGURE 1).

Projecting rearwardly from the rear face 22 of the shear head 16 is a compacting structure 56 which includes upper and lower cross members 58 and 60, respectively, and upright reinforcing members 62. This compacting structure 56 is rigidly secured to, and carried by the shear head 16 so that both may move together vertically as a single unit. Preferably, the upper cross member 58 of the compacting structure and the upper cross head of the shear are integrally formed with the plate member 20, as shown in FIGURE 2. Secured to the bottom of the lower cross member 26 is a transverse compression member or ledge 66 which is spaced above the cutting edge of the movable blade 28. The rear face 22 of the cross head 26 is slightly recessed to receive the forward edge of the compression member 66 which extends rearwardly from the shear head 16, and above the bed member 44 for engaging and finally compacting scrap resting on top of the bed liner 54 on the downward stroke of the shear head 16. Immediately below the compression ledge 66 and secured to the rear face of the shearing head 16 is a wedging member 70 which has a relatively vertical lower portion 72 and outwardly inclined upper portion 74. Although the upper surface of the wedge member 70 could be flush against the bottom of the member 66, preferably the top of the wedge member is slightly recessed into the lower surface of this member, as shown in FIGURE 2. It will be noted from FIGURE 2 that the wedging member 70 is recessed into the rear surface 22 of the head 16 so that the vertical outer surface 76 of the lower portion 72 of the wedging member forms a straight and smooth surface with the cutting edge and rearward surfaces of the movable blade 28 and associated wear plate 30. Preferably, the inclined surface 78 of the upper portion 74 of the wedge member 70 is disposed at an angle of approximately 15 degrees from the plane of the rear surface 22 of the shear head. However, any angle of inclination within the range of 5 degrees to 30 degrees, would be effective, within limits, for the purposes to be explained hereinafter.

The front surface of the bed member 44, which includes the forward surface of the fixed blade 46, extends well below the cutting edge 52 so that the portion of the cross head 26 carrying the movable blade 28 may move vertically past and below the cutting edge of the fixed blade on the downward motion of the shear 16. The travel of the shear 16 is adjusted so that, although the edge of the blade 28 passes below the edge of the fixed blade 46, the compression member 66 stops short of engagement with any part of the blade 46 or bed 44.

In front of the bed 40 and located therebelow, so as not to interfere with the travel of the shear head 16, is a downwardly and forwardly inclined plate 82 which constitutes a chute for the work which is sheared by the blades 28 and 46. Thus, the cut scrap may fall vertically to the inclined plate 82 and be delivered to the front of the machine.

*Operation*

In the operation of the shear, it is usually desirable to give a final compacting to the forwardmost portions of the scrap being delivered. Accordingly, when work has been delivered to the bed of the shear in the direction of the arrow of FIGURE 2, with the forwardmost portion of the scrap adjacent to, but not touching, the vertical plane of movement of the cutting edge 52 of the movable blade 28, the shear head 16 is moved downward, finally compacting the work upon the bed, but without any shearing action. Then, the shear head may be raised to its full height while the finally compacted portion of the work is advanced forwardly beyond the cutting edge 50 of the fixed blade 46 by known mechanical means. At this point, the work, or scrap, is positioned for the initial shearing operation, and the motor 36 may be operated to move the shear head downwardly in a shearing stroke. Due to the vertical spacing between the cutting edge 52 of the blade 28 and the ledge 66, the shear blade 28 ideally contacts and cuts the scrap before the ledge contacts any portion of the scrap rearwardly of the cutting blades, as shown in FIGURE 4. However, after the shearing blade has advanced past and below the edge 50 of the cooperative fixed blade 46, the compression member 66 engages and compresses the scrap rearwardly of the blade edges. At this point, as the shear head continues its downward stroke, the shearing operation being completed, and all of the power and force of the motor 36 is utilized to finally compact the scrap beneath the compression member. When the shear head has completed its downward travel as shown in FIGURE 5, the scrap between the bed member 40 and the compacting member 66 will be compressed to the desired thickness.

It will be observed from FIGURE 5 that the inclined surface of the wedging member, during the final portion of the downward stroke of the shear head, engages with the forward-most edges of the scrap adjacent to the cut made by the shear blades 28 and 46. Were it not for this wedging member these edges, which may be rough and jagged, would tend to ride or bear against the rear surface of the shear head 16, including the blade 28, and thus might well be jerked or lifted upward by frictional engagement with the upward moving shear head 16. This result, of course, would be highly undesirable and would, to a large extent, defeat the compacting of the scrap which has already taken place since that scrap would be pulled, separated, or shreaded by the aforesaid engagement with the rear surfaces of shear head 16 and the blade 28.

The wedging member 70 tends to avoid those consequences during the compacting operation by clinching the sheared edges of the scrap remaining on the bed 44 and compressing those edges rearwardly of the shearing surfaces of the head 16. In addition to the clinching or compressing effect on the edges of the scrap, a slight rearward movement is imparted to the forward-most portions of the scrap, therefore removing the scrap from the immediate area of the vertical path of travel of the shear blade 28. It will be understood by those skilled in the art that the inclined portion of the wedging member 70 cannot feasibly pass by or below the cutting edge of the fixed blade, and therefore, it is preferable that the dimensions and location of the inclined portion of the wedge be selected in view of the desired minimum distance between the compression ledge 66 and the bed liner 54, and the length of the downward stroke of the shear head 16.

Figure 6:
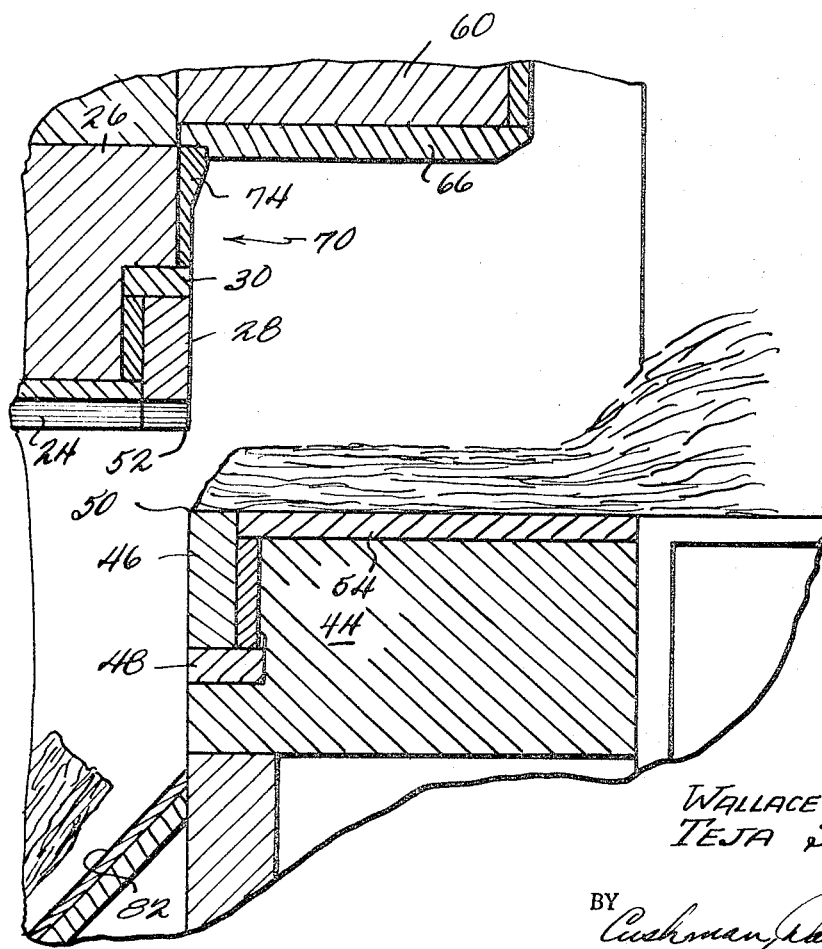
FIGURE 6 is a view corresponding to FIGURES 2, 4, and 5, but illustrating the position of the shear parts with the movable shear head on the return stroke after shearing, and particularly illustrating the clearance between the rear vertical surface of the cross head and blade, and the compacted scrap metal on the bed of the shear.

Thus, as viewed in FIGURE 6, the shear head 16, including the blade 28 thereof, may move cleanly on its upward stroke past the blade 46 without any substantial interference or engagement with the compacted scrap remaining on the shear bed. Consequently that scrap, by avoiding contact with the upwardly moving shear head, remains in its compacted state without any shreading or separating effects. Whether the compression member 66 engages and compacts the scrap on the bed 44 before the shearing of the work between the blades 28 and 46 is complete or not is a matter of choice, depending on the vertical spacing between the member 66 and the cutting edge 52, and upon the depth of the scrap upon the bed 44. However, the spacing should be selected so that at least the final portion of the compacting, which requires the most force, is effected subsequently to the shearing of the work so that the full force of the motor 36 may be employed for compacting purposes.

When the shear head 16 reaches its upwardmost position, the compacted scrap on the shear bed may be advanced forward the desired distance by the means heretofore mentioned. Then, the cycle described hereinabove may be repeated with the initial shearing of the scrap on the downward stroke of the shear and the subsequent final compacting of the scrap rearwardly of the shear blade.

From the foregoing description of the preferred embodiment of this invention, it is evident that the objects together with many particular advantages are successfully achieved. While the preferred embodiment of the invention has been described and illustrated in the accompanying drawings, numerous modifications may be made without departing from the scope of the invention, and therefore these drawings and description should be interpreted as being merely illustrative of the invention, and not in any limiting sense.

What is claimed is:

1. A shearing machine comprising: a frame; a fixed blade mounted on said frame; a movable blade structure carried by said frame for movement toward and away from said fixed blade to shear work therebetween; motor means operatively joined to said movable blade structure to drive same toward and away from said fixed blade; means carried by said movable blade structure for compacting work disposed rearwardly of the cutting edge of said fixed blade while said movable blade structure moves toward said fixed blade but subsequent to a portion of the shearing of the work disposed between the cutting edges of said movable blade structure and said fixed blade; and means carried by said movable blade structure for wedging said rearwardly disposed work away from the path of travel of said movable blade structure so that said work remains clear of the surfaces of said movable blade structure when said structure moves away from said fixed blade.

2. A shearing machine comprising: a frame; a fixed blade mounted on said frame; a movable blade structure carried by said frame for movement toward and away from said fixed blade to shear work therebetween, said movable blade structure including a portion thereof carrying a blade member for linear movement toward and past the cutting edge of said fixed blade, and returning said blade member along the same line past and away from the cutting edge of said fixed blade; motor means operatively joined to said movable blade structure to drive same toward and away from said fixed blade; means carried by said movable blade structure for compacting work disposed rearwardly of the cutting edge of said fixed blade; means carried by said movable blade structure for wedging said rearwardly disposed work away from the plane of travel of said movable blade structure so that said work remains clear of the surfaces of said blade member carrying portion of said blade structure during the return movement of said portion past and away from said fixed blade.

3. Apparatus as defined in claim 2 wherein said wedging means comprise a member having an inclined surface adapted to bear against the forward portion of said rearwardly disposed work as said compacting means move toward said work to compress same.

4. A shearing machine comprising: a frame; a fixed blade structure mounted on said frame, said structure including a blade member having a forwardly disposed cutting edge and a transverse bed member disposed rearwardly of said blade member; a movable blade structure carried by said frame for reciprocating movement in a vertical plane toward and away from said fixed blade structure to shear work therebetween, said movable blade structure including a portion thereof carrying a blade member for vertical movement slightly forwardly of the cutting edge of said fixed blade member so that said movable blade member passes above and below the cutting edge of said fixed blade member; motor means operatively joined to said movable blade structure to drive the same toward said fixed blade structure so that the cutting edge of said movable blade advances toward and past the cutting edge of said fixed blade member, and to retract said movable blade structure away from said fixed blade structure; said movable blade structure also having means integral therewith including a transverse compression surface extending rearwardly of the cutting edge of said movable blade for compacting work disposed between said transverse bed member and said compression surface; said compression surface being spaced vertically from the cutting edge of said movable blade so that said compression surface engages and compacts the work disposed between said bed member and said compression surface after the cutting edge of said movable blade passes the cutting edge of said fixed blade member, whereby the full force of said motor means is employed, first, to shear work disposed between said movable blade and said fixed blade member and, second, to compact work disposed rearwardly of said blade and blade member between said bed member and said compression surface during one motion of said movable blade structure; and means carried by said movable blade structure for wedging the work disposed rearwardly of the cutting edge of said fixed blade member away from the vertical path of travel of said movable blade structure so that said work remains clear of the vertical surfaces of said movable blade structure when said structure is retracted vertically away from said fixed blade structure.

5. A shearing machine comprising: a frame; a fixed blade mounted on said frame; a movable blade structure carried by said frame for movement toward and away from said fixed blade to shear work therebetween; means operable to drive said movable blade structure toward and away from said fixed blade; means carried by said movable blade structure for compacting work disposed rearwardly of the cutting edge of said fixed blade while said movable blade structure moves toward said fixed blade; and means carried by said movable blade structure for wedging said rearwardly disposed work away from the path of travel of said movable blade structure subsequent to a portion of the shearing of the work disposed between the cutting edges of said movable blade structure and said fixed blade, so that said work remains clear of the cutting surfaces of said movable blade structure when said structure moves away from said fixed blade.

6. Apparatus as defined in claim 5 wherein said wedging means comprise a member having an inclined surface adapted to bear against the forward portion of said rearwardly disposed work when said compacting means move toward said work to compress the same.

7. Apparatus as defined in claim 6 wherein said inclined surface is inclined at an angle of approximately 15° from the plane defined by the cutting edge of said movable blade structure as said movable structure moves toward and away from said fixed blade.

8. Apparatus as defined in claim 6 wherein said inclined surface is inclined at an angle of from 5° to 30° from the plane defined by the cutting edge of said movable blade structure as said movable structure moves toward and away from said fixed blade.

9. A shearing machine comprising: a frame, a fixed blade mounted on said frame; a movable blade structure having a cutting edge carried by said frame for movement toward and away from said fixed blade to shear work therebetween; means operable to drive said movable blade structure toward and away from said fixed blade; a bed extending rearwardly of the cutting edge of said fixed blade for separating work to be sheared between said movable blade and said fixed blade; and means carried by said movable blade structure rearwardly of said cutting edge for urging said rearwardly disposed work away from the plane of travel of said movable blade structure after a cut has begun and before said movable blade structure has begun its return movement so that work remains clear of the surfaces of said movable blade structure when said structure moves away from said fixed blade.

10. Apparatus as defined in claim 9 wherein said means for urging said rearwardly disposed work comprises a member having an inclined surface adapted to bear against said rearwardly disposed work.

11. Apparatus as defined in claim 10 wherein said inclined surface is inclined at an angle of approximately 15° from the plane defined by the cutting edge of said movable blade structure as said movable structure moves toward and away from said fixed blade.

12. Apparatus as defined in claim 10 wherein said inclined surface is inclined at an angle of from 5° to 30° from the plane defined by the cutting edge of said movable blade structure as said movable structure moves toward and away from said fixed blade.

References Cited
UNITED STATES PATENTS

| | | | |
|---|---|---|---|
| 2,342,049 | 2/1944 | Holmbeck | 83—228 |
| 3,007,359 | 11/1961 | Lang et al. | 83—228 X |
| 3,037,446 | 6/1962 | Thompson | 100—98 |
| 3,101,045 | 8/1963 | Van Endert | 100—233 |
| 3,126,817 | 3/1964 | Thompson | 100—98 |

FOREIGN PATENTS 845,438  11/1952  Germany.

BILLY J. WILHITE, *Primary Examiner.*